US008840698B2

(12) United States Patent
Chmayssani et al.

(10) Patent No.: US 8,840,698 B2
(45) Date of Patent: Sep. 23, 2014

(54) DOUBLE HELIX GREASE FILTER

(75) Inventors: Khalil Chmayssani, Nolensville, TN (US); Jeff Cook, Brentwood, TN (US)

(73) Assignee: Franke Technology and Trademark Ltd., Hergiswil (CH)

( * ) Notice: Subject to any disclaimer, the term of this patent is extended or adjusted under 35 U.S.C. 154(b) by 233 days.

(21) Appl. No.: 13/433,381

(22) Filed: Mar. 29, 2012

(65) Prior Publication Data

US 2012/0247074 A1    Oct. 4, 2012

Related U.S. Application Data

(60) Provisional application No. 61/468,760, filed on Mar. 29, 2011.

(51) Int. Cl.
   *B01D 45/16* (2006.01)
   *B01D 45/06* (2006.01)

(52) U.S. Cl.
   CPC ............... *B01D 45/06* (2013.01); *B01D 45/16* (2013.01); *Y10S 55/36* (2013.01)
   USPC ............ 55/456; 55/457; 55/DIG. 36; 55/434; 55/440; 55/441; 55/447

(58) Field of Classification Search
   USPC ............................. 55/456, 457, 434, 441, 440
   See application file for complete search history.

(56) References Cited

U.S. PATENT DOCUMENTS

| | | | | |
|---|---|---|---|---|
| 1,047,469 A * | 12/1912 | Wendt | | 55/456 |
| 2,446,882 A * | 8/1948 | Morrison | | 55/347 |
| 2,461,395 A * | 2/1949 | Psikal | | 55/327 |
| 2,754,970 A * | 7/1956 | Ross | | 210/194 |
| 4,182,277 A * | 1/1980 | Burton et al. | | 122/491 |
| 4,382,807 A * | 5/1983 | Diachuk | | 96/316 |
| 5,641,331 A * | 6/1997 | Diachuk | | 55/343 |
| 2010/0275561 A1* | 11/2010 | Lundquist et al. | | 55/456 |

OTHER PUBLICATIONS

Zane Satterfield, P.E. ; Fundamentals of Hydraulics: Pressure; Tech Brief: Winter 2010 vol. 9 Issue 4; pp. 1-4 http://www.nesc.wvu.edu/pdf/dw/publications/ontap/2010_tb/hydraulics_pressure_DWFSOM147.pdf.*
David M. Harrison; Manometers; Jul. 2002; Dept. of Physics, University of Toronto; all pages http://www.upscale.utoronto.ca/PVB/Harrison/Manometer/Manometer.html.*
Bolt Science Limited; Glossary: Termonology related to nuts and bolts; 2006; p. 7; https://web.archive.org/web/20061025040825/http://www.boltscience.com/pages/glossary.htm.*

* cited by examiner

*Primary Examiner* — Duane Smith
*Assistant Examiner* — Britanny Precht
(74) *Attorney, Agent, or Firm* — Volpe and Koenig, P.C.

(57) ABSTRACT

A fat or grease filter for a ventilator or exhaust hood is provided, and includes a cartridge assembly that is removably attached to a tube assembly. The cartridge assembly includes at least one helix assembly that is received in an associated tube of the tube assembly. The at least one helix assembly located inside the associated tube defines a first helical air path between an inlet located at an upper front side of the tube assembly and a bottom equalizer manifold connected to the associated tube, and a second helical air path between the equalizer manifold and an outlet located at an upper back side of the tube assembly. The equalizer manifold directs the air flow from the first to the second helical air path. Centrifugal force created within the first and second helical air paths causes fatty particles to separate from the airstream and stick inside the tube.

8 Claims, 3 Drawing Sheets

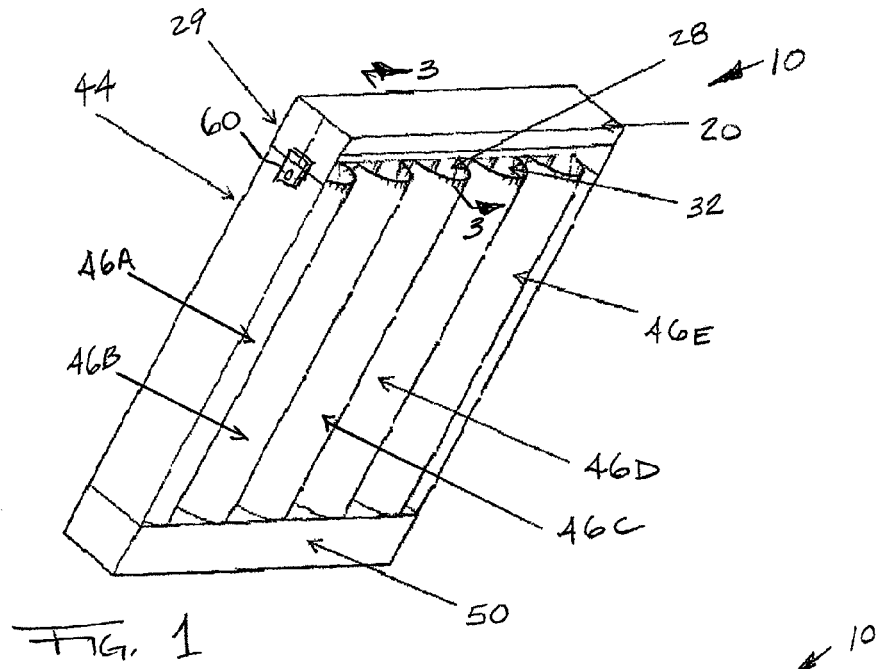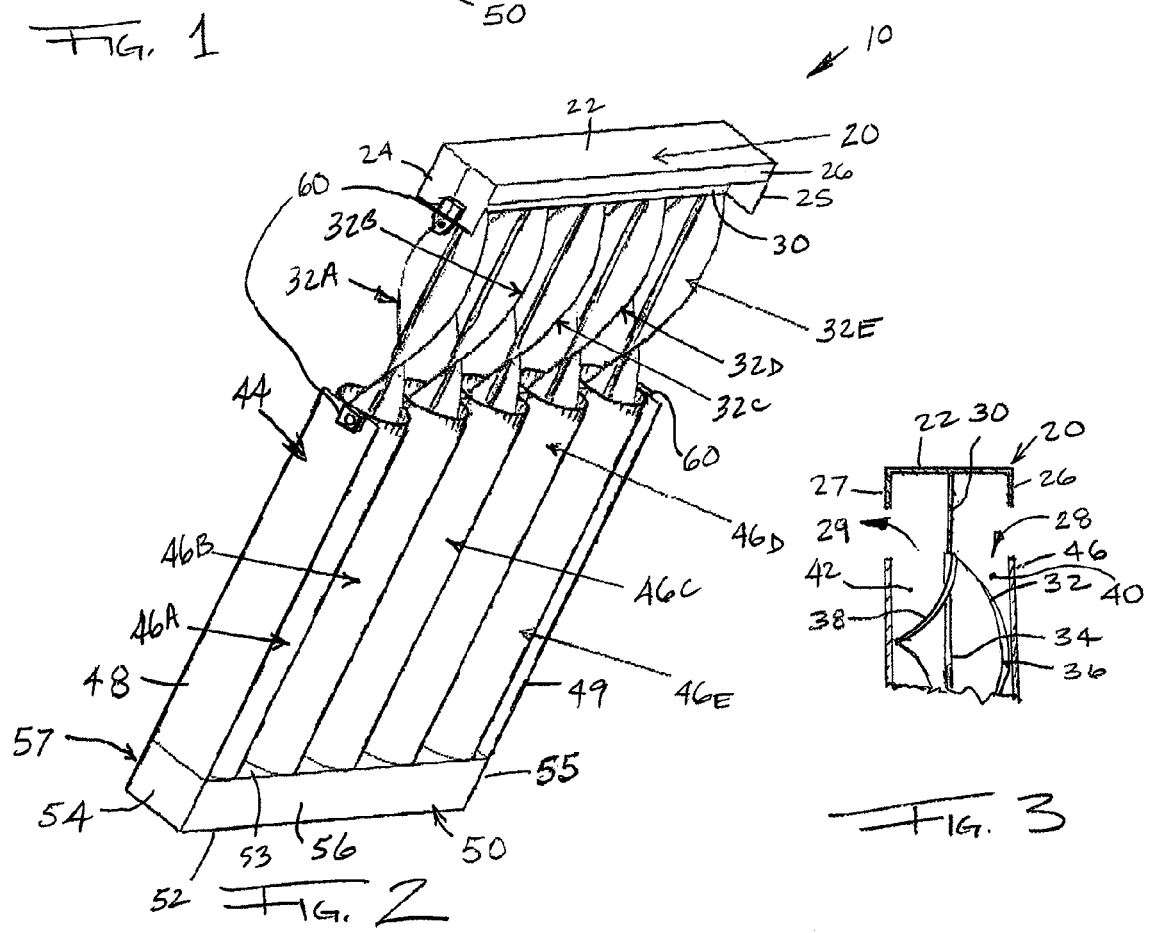

DOUBLE HELIX GREASE FILTER

CROSS-REFERENCE TO RELATED APPLICATIONS

This application claims the benefit of U.S. Provisional Application No. 61/468,760, filed Mar. 29, 2011, which is incorporated herein by reference as if fully set forth.

FIELD OF INVENTION

The invention generally relates to a grease filter for exhaust hoods over cooking appliances in commercial, domestic and institutional kitchens.

BACKGROUND

Grease filters are used in commercial and residential kitchens in order to filter fatty particles and/or grease that become airborne during cooking operations. This is important in order to prevent the deposit of fat in and around the oven or cooking surfaces which could increase the risk of fire. Further, it helps reduce maintenance and cleaning operations in the area of the oven and cooking surfaces. This is necessary because fatty particles include fatty acids which can have a strong corrosive effect on various components in and around the cooking area, including the ventilator hood and the air moving components.

Prior known devices provide a mesh, baffles, cyclonic and/or labyrinth filters, typically made from stainless steel or aluminum, in order to remove fatty particles suspended in the air during cooking.

Of the known filters, typically in commercial operations a removable and cleanable baffle or labyrinth filter is provided which can be made of aluminum, stainless steel, or galvanized steel, with stainless steel being preferred due to its long life based on its resistance to corrosive effects. These known filters work on the principle of having the air flow carrying the fatty particles passing through openings and having to turn through a tortuous or labyrinth-type path during which time the fatty particles are separated onto the surfaces of the baffles. The main characteristic of the tortuous path or labyrinth-type filters is that the air flow changes direction more than one time and due to these changes in direction, the fatty particles are deposited onto the baffle surfaces. Such known filters are described, for example, in U.S. Pat. No. 6,656,244 which provides a fat removing labyrinth filter that is suitable for use in a kitchen ventilator and which is described as being easily assembled and disassembled for cleaning. However, this assembly and disassembly involves separating multiple generally sheet-shaped baffles from one another.

It would be desirable to provide a more efficient means of removing fatty particles suspended in air that is lightweight and easily dis-assembleable for cleaning and that provides good filtration of fatty particles from the air flow with low head loss.

SUMMARY

Briefly stated, a double helix grease filter is provided formed from a cartridge assembly and a tube assembly. The cartridge assembly is received in the tube assembly and is easily removable for cleaning. The cartridge assembly includes at least one double helix assembly having a cylindrical envelope that is adapted to be received in an associated tube of the tube assembly. The at least one helix assembly fits snugly inside the associated tube and defines a first helical air path between an inlet located at an upper front side of the tube assembly and a bottom equalizer manifold and a second helical air path between the equalizer manifold and an outlet located at an upper back side of the tube assembly. The base of the tube is connected to the equalizer manifold which directs the air flow from the first helical air path to the second helical air path. The inlet is preferably narrow and accelerates the air flow which is drawn downwardly through the first helical air path formed by the helix prior to being drawn upwardly through the second helical air path. Centrifugal force created by the rotating air within the tube forces the fatty particles to separate from the airstream and stick to an inner wall of the tube. This in addition to the 180° turn in the airstream created by the equalizer manifold forces the fatty particles to be deposited in the tube and/or the equalizer manifold prior to the air being discharged from the filter assembly. The grease deposited on the inner wall of the tube and in the equalizer manifold is drained via drain holes at the base of the filter assembly.

In accordance with the invention, a number, size and number of turns of the double helix assembles can be varied depending upon the particular application. The number and size of the associated tubes matches the double helix assemblies.

In another aspect, the inner wall of the tube(s) can be coated with a quick release coating such as PTFE.

A latch assembly or similar device is preferably provided which holds the cartridge assembly to the tube assembly in the assembled state of the filter assembly, and is easily released in order to allow disassembly for cleaning.

Alternatively, the tube assembly can be formed in two halves that are connected together by a hinge so that the tube assembly can be pivoted open in order to remove the cartridge assembly.

Alternatively, the tube assembly can be formed in two halves connected to each other by a hinge, with each half containing on half of the double helix cartridge so that when joined together, the double helix shape is complete.

Preferably, each helix assembly is made of two side-by-side helical ribbons, each being twisted to form at least a 360° turning air path. The helical ribbons are connected to a center spine. One or more of the helix assemblies is then connected to a dividing wall of the cartridge assembly that separates the inlet side and outlet side.

Those skilled in the art will recognize that the above features as well as the additional features described below can be used individually or in various combinations in order to define additional embodiments of the filter assembly according to the invention.

BRIEF DESCRIPTION OF THE DRAWINGS

The foregoing summary as well as the following detailed description will be better understood when read in conjunction with the appended drawings which illustrate one preferred embodiment of the invention. In the drawings:

FIG. 1 is perspective view of a filter assembly in accordance with the invention.

FIG. 2 is a perspective view of the filter assembly of FIG. 1, shown with the cartridge assembly being removed from the tube assembly.

FIG. 3 is a partial cross-sectional view taken along lines 3-3 in FIG. 1.

DETAILED DESCRIPTION OF THE PREFERRED EMBODIMENTS

Figures 4, 5:
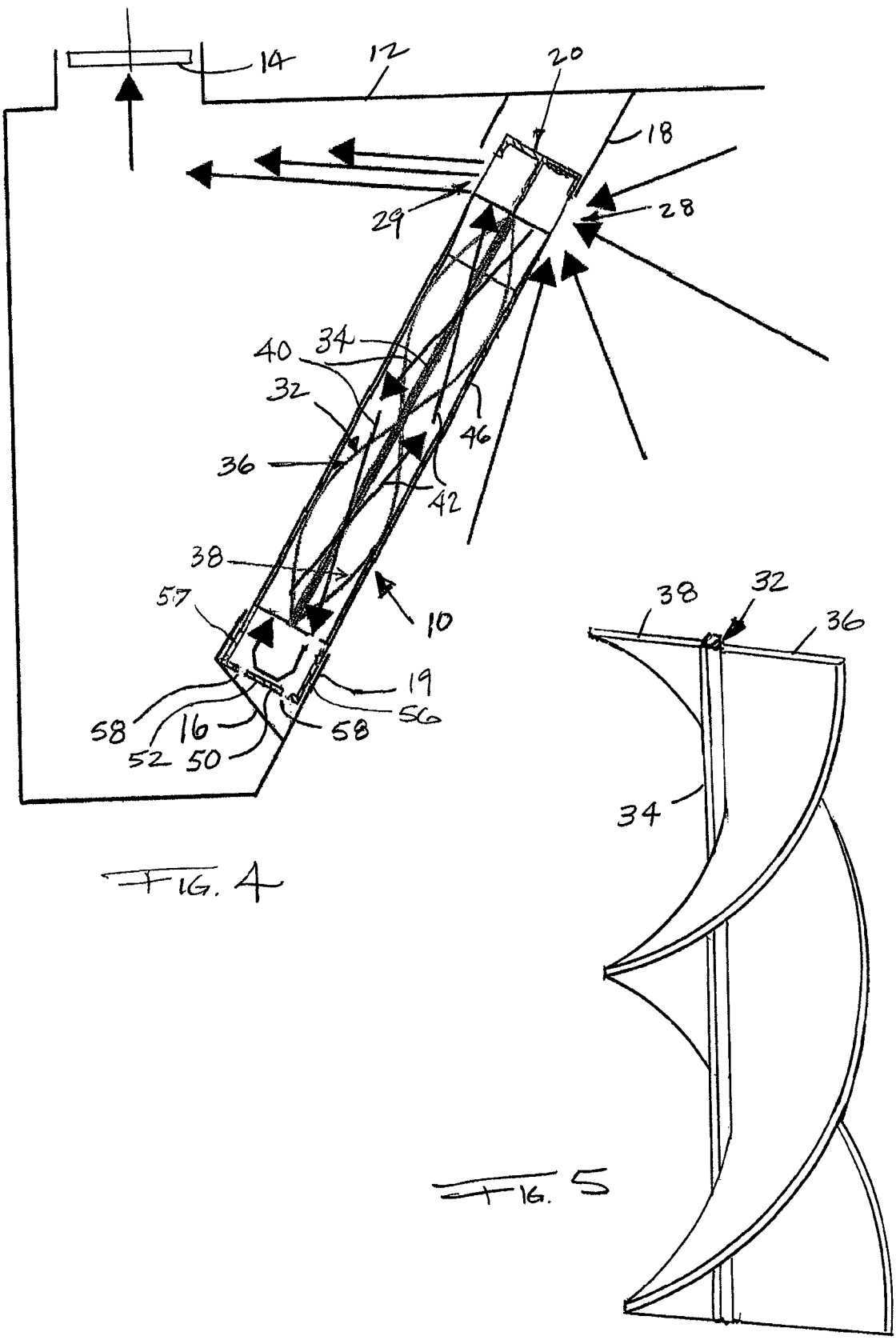
FIG. 4 is a schematic cross-sectional view through the filter assembly of FIG. 1 installed in an exhaust hood which illustrates the air flow through the filter assembly and the exhaust hood.
FIG. 5 is an enlarged perspective view showing a single helix assembly used in the filter assembly of FIG. 1.

Certain terminology is used in the following description for convenience only and is not considered limiting. Words such as "front," "back," "top," "bottom," "left," and "right" designate directions in the drawings to which reference is made, and are not considered limiting. This terminology includes the words specifically noted above, derivatives thereof and words of similar import. Additionally, the terms "a" and "one" are defined as including one or more of the referenced item unless specifically noted. The phrase "at least one of" followed by a list of two or more items, such as "a", "b", or "c" means any individual one of a, b, or c, as well as any combination thereof.

Referring to FIGS. 1 and 4, a filter assembly 10 according to a preferred embodiment of the invention is shown individually, in FIG. 1, and installed in an exhaust hood 12, in FIG. 4. The exhaust hood 12 includes a fan 14 that is used to draw air through the filter assembly 10. Generally, such exhaust hoods 12 include filter holding structures 18 and 19 which are used to engage and hold the filter assembly 10. A grease collection trough 16 is generally located at the bottom filter holding structure 19 and is used to remove grease trapped by the filter assembly 10 in the exhaust hood 12.

Referring to FIGS. 1 and 2, the construction of a first preferred embodiment of the filter assembly 10 in accordance with the invention is shown in detail. The filter assembly 10 includes a cartridge assembly 20 which is removably insertable into a tube assembly 44. The cartridge assembly 20 is formed with a top 22 having two sidewalls 24 and 25 depending from opposite sides thereof. A front wall 26 extends down from a front side and, in the installed position of the cartridge assembly 20 in the tube assembly 44, ends at a distance spaced apart from the top of the tube assembly in order to form an air inlet 28. See FIG. 3. The back wall 27 similarly extends down from the top 22 stops at a distance spaced apart from the top of the tube assembly 44 to form the air outlet 29 between the tops of the tubes and the bottom of the back wall 27. A dividing wall 30 is located between the front wall 26 and the back wall 27 and extends down to a position where it connects with the top edges of the helix assemblies 32A-E, described in further detail below.

As shown in detail in FIGS. 2, 3 and 5, at least one helix assembly 32 and preferably five helix assemblies 32A-32E (in FIG. 2) are provided. Each helix assembly 32A-32E includes a spine 34 as well as two helical ribbons 36, 38 connected to the spine 34 that are arranged side-by-side in twisted form in order to define two 360° rotating air paths 40, 42. Preferably, the helix assembly defines a cylindrical envelope, but a conical envelope could also be utilized. While the air paths 40, 42 rotate 360° in the preferred embodiment, those skilled in the art will recognize that a greater or lesser number of turns can be utilized. The top edges of the spine 34 and both helical ribbons 36, 38 are connected to the dividing wall 30 in order to form a barrier between the inlet and outlet side of the filter assembly 10. It would also be possible to use a single twisted helical ribbon without a spine, or to form the helix assembly as a single molded part.

Still with reference to FIGS. 1-3, the cartridge assembly 20 is removably insertable into a tube assembly 44. The tube assembly 44 includes an associated tube 46 for each helix assembly 32, with preferably five tubes 46A-46E arranged in complementary positions to the helix assemblies 32A-32E of the cartridge assembly 20. The tubes 46A-46E are mounted between sidewalls 48 and 49 and can be connected to each other or short baffles can be located between the adjacent sides of the tubes 46A-46E. The sidewalls 48 and 49 are connected to the outer edges of the outermost tubes 46A and 46E. The tubes 46A-46E are open at their top sides and the bottom sides are connected to an equalizer manifold 50. The equalizer manifold 50 includes a base 52 and a top 53 that are connected together via sidewalls 54 and 55 as well as front and back walls 56 and 57. The tubes 46A-46E are in communication with the plenum space enclosed by the equalizer manifold 50 via openings in the top 53 where the tubes are connected. While a single manifold 50 is preferred due to the ability to equalize pressure between a plurality of tubes 46A-46E, individual manifolds could be provided for each of the tubes 46A-46E.

Preferably, the inside surfaces of the tubes 46A-46E allow for a good fit with small tolerances to the helix assemblies 32 of the cartridge assembly 20 in order to define a first helical air path 40 on the same side as the inlet 28 of the filter assembly 10 as well as a second helical air path 42 on the same side as the outlet 29, represented with arrows in FIG. 4, with limited air flow leakage.

The filter assembly 10 is reversible front-to-back in the preferred configuration, with the air inlet 28 and the air outlet 29 remaining at the top and switching function. However, a handle or other keying can be provided to maintain installation in one direction only, if desired.

As shown in FIG. 4, at least one grease drain hole 58 and preferably a plurality of grease drain holes 58 are located in the base 52 of the equalizer manifold 50 in order to allow grease to drain down into the grease collector trough 16. Preferably, the drain holes 58 are provided at the front and back sides of the bottom of the equalizer manifold 50 to facilitate grease drainage regardless of the direction that the filter assembly 10 is installed in.

Preferably a latch assembly 60 is used to hold the cartridge assembly 20 in the assembled position with the tube assembly 44. The specific type of latch or catch utilized can be varied.

In the preferred embodiment, the tube assembly 44 as well as the cartridge assembly 20 are made of stainless steel. Alternatively, other materials could be utilized. The inner walls of the tubes 46A-46E may be coated with a quick release coating such as PTFE (Teflon), if desired, in order to provide for easier cleaning. Additionally, the surfaces of the helix assemblies 32 can also be coated with PTFE if desired. It is also possible to form the helix assembly 32 out of other materials such as aluminum or a plastic compound. For example, each of the helix assemblies 32 could be molded as a single piece.

Those skilled in the art will recognize that the number of tubes as well as the size of the tubes can be varied. Additionally, the number and size of the helix assemblies 32A-32E could also be varied in addition to the number of twists of the helical ribbons 36, 38 of each helix assembly 32.

Referring to FIG. 4, the operation of the filter assembly 10 is described in detail. An exhaust fan 14 of the exhaust hood 12 creates suction in order to draw air from the cooking area through the filter assembly 10. Air with grease or fat particles is drawn through the inlet 28 at the upper front side of the filter assembly 10. The inlet 28 is relatively narrow and accelerates the air flow as it is drawn downwardly through the first helical air path 40 created by the helix assemblies 32A-32E located in the tubes 46A-46E. As the air is drawn downward through the helix assemblies 32A-32E into the equalizer manifold 50, centrifugal force created by rotating the airflow 360° within the tubes 46A-46E forces the grease and/or fat particles to separate from the air flow and stick to the inner walls of the tubes 46A-46E. The air flow enters the equalizer manifold 50, which allows the air streams from the separate tubes 46A-46E to mix, thereby equalizing the pressure drop over the array of tubes 46A-46E. The air flow is forced to make a 180° turn back upward in order to travel toward the outlet 29 via the second helical air flow paths 42 defined between the helix assemblies 32A-32E and the inner walls of the tubes 46A-46E. The airflow also turns 180° in the equalizer manifold 50, which forces additional fat particles and grease to be deposited on the inner surface of the equalizer manifold 50. As the air moves upward through the second, outlet side helical air path toward the outlet 29, the air flow makes another 360° rotation with the centrifugal force created by the rotating air within the tubes 46A-46E forcing additional grease and/or fat particles onto the walls of the tubes 46A-46E. The grease collected on the inner walls of the tubes 46A-46E, whether on the walls defining the first or second helical air flow paths 40, 42, is drained by gravity and collected in the equalizer manifold 50. The grease is drained from the equalizer manifold 50 via the small drain holes 58 located at the base 52 and into the grease collection trough 16. The filtered air then exits the outlet 29 and is drawn out of the exhaust hood 12 via the fan 14. For cleaning, the filter assembly 10 is removed, and the cartridge assembly 20 is removed from the tube assembly 44 for cleaning, by sliding helix assemblies 32 out from the tubes 46.

Figure 6:
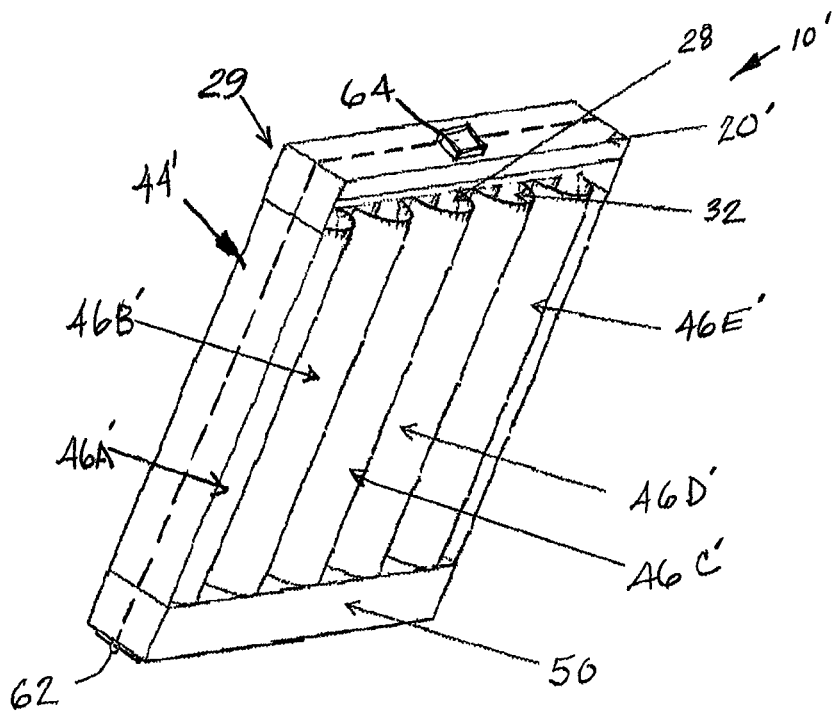
FIG. 6 is a perspective view of a second embodiment of the invention.

Referring to FIG. 6, a second embodiment of the filter assembly 10' is shown. The second preferred embodiment of the filter assembly 10' is the same functionally as the first embodiment of the filter assembly 10. However, the tube assembly 44' is made with a front half and a back half that are connected together via a hinge 62 located on the bottom. A latch 64 or similar device is located at the top for holding the two halves of the tube assembly 44 together. Each of the tubes 46A'-46E' are split along a central plane. A helix assembly 32, as described above, is located in each of the tubes 46A'-46E'. This allows the cartridge assembly 20' to be removed by unlatching the latch 64 and pivoting open the front and back halves of the tube assembly 44'. Those skilled in the art will recognize that other methods for constructing the tube assembly can be provided to allow for easy access to and removal of the cartridge assembly 20' for cleaning, and the invention is not limited to the sliding or hinged assemblies described in detail above.

Figure 7:
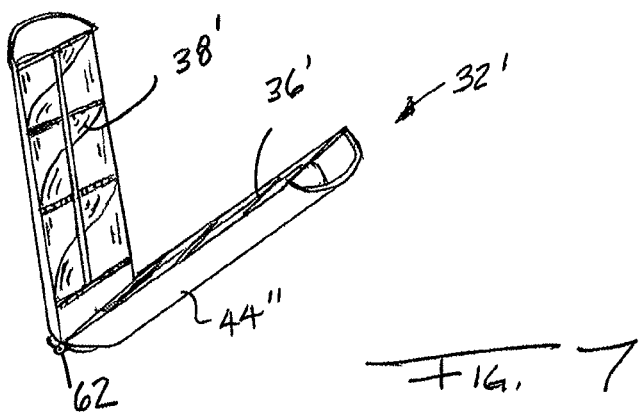
FIG. 7 is a detail view, in cross-section showing a third embodiment of a hinged tube/double helix assembly.

Referring to FIG. 7, another alternate embodiment of a hinged tube/double helix assembly 32' is shown. Here, in a similar manner to FIG. 6, each tube assembly 44" is made with a front half and a back half that are connected via the hinge 62. A front double helix half 36' is located in the front half of the tube assembly 44" and a back double helix half 38' is located in the back half of the tube assembly 44". When the front half and back half of the tube assembly 44" are joined together, the front double helix half 36' and the back double helix half 38' are joined to form the double helix shape. Those skilled in the art will recognize that other methods for constructing the tube assembly 44" with double helix portions located in each of the front and back halves can be provided can be provided.

According to the invention, the filter assembly can be made in various sizes with various numbers of tubes in order to accommodate different installation sizes of standard filters as well as specialized filters for exhaust hoods already in place and/or new exhaust hoods being developed.

While a preferred embodiment of the invention has been described in detail, those skilled in the art will recognize that various changes can be made within the scope of the invention as defined by the appended claims.

What is claimed is:

1. A fat or grease filter, comprising:
a cartridge assembly that is removably attached to a tube assembly, the cartridge assembly includes at least one helix assembly that is adapted to be received in an associated tube of the tube assembly, the at least one helix assembly located inside the associated tube defines a first helical air path between an inlet located at an upper front side of the tube assembly and an equalizer manifold, and a second helical air path between the equalizer manifold and an outlet located at an upper back side of the tube assembly, the second helical air path being located on an opposite side of the at least one helix assembly in the associated tube from the first helical air path, the equalizer manifold directs the air flow from the first helical air path to the second helical air path, wherein centrifugal force created by rotating air within the first and second helical air paths is adapted to cause fatty particles to separate from the airstream and stick to an inner wall of the tube.

2. The fat or grease filter of claim 1, wherein a 180° turn in the airstream created by the equalizer manifold is adapted to force additional fatty particles to be deposited in at least one of the tube or the equalizer manifold prior to the air being discharged from the filter assembly.

3. The fat or grease filter of claim 1, wherein the cartridge assembly includes a plurality of the helix assemblies, and the tube assembly includes a plurality of the associated tubes located in complementary positions to the helix assemblies.

4. The fat or grease filter of claim 3, wherein the equalizer manifold is connected to a plurality of the tubes in order to equalize a pressure drop between the tubes.

5. The fat or grease filter of claim 1, further comprising a latch that holds the cartridge assembly in an installed position in the tube assembly.

6. The fat or grease filter of claim 1, wherein the cartridge assembly includes a top panel with side walls, a front wall and a back wall, with a dividing wall extending from the top panel between the front wall and the back wall, and the at least one helix assembly is connected to the dividing wall to direct the airflow through the inlet into the first helical air path.

7. The fat or grease filter of claim 1, wherein the equalizer manifold includes at least one drain hole at a bottom thereof.

8. The fat or grease filter of claim 1, wherein the helix assembly includes two helical ribbons that each rotate 360°, with the helical ribbons being connected to a spine.

* * * * *